United States Patent Office 3,111,308
Patented Nov. 19, 1963

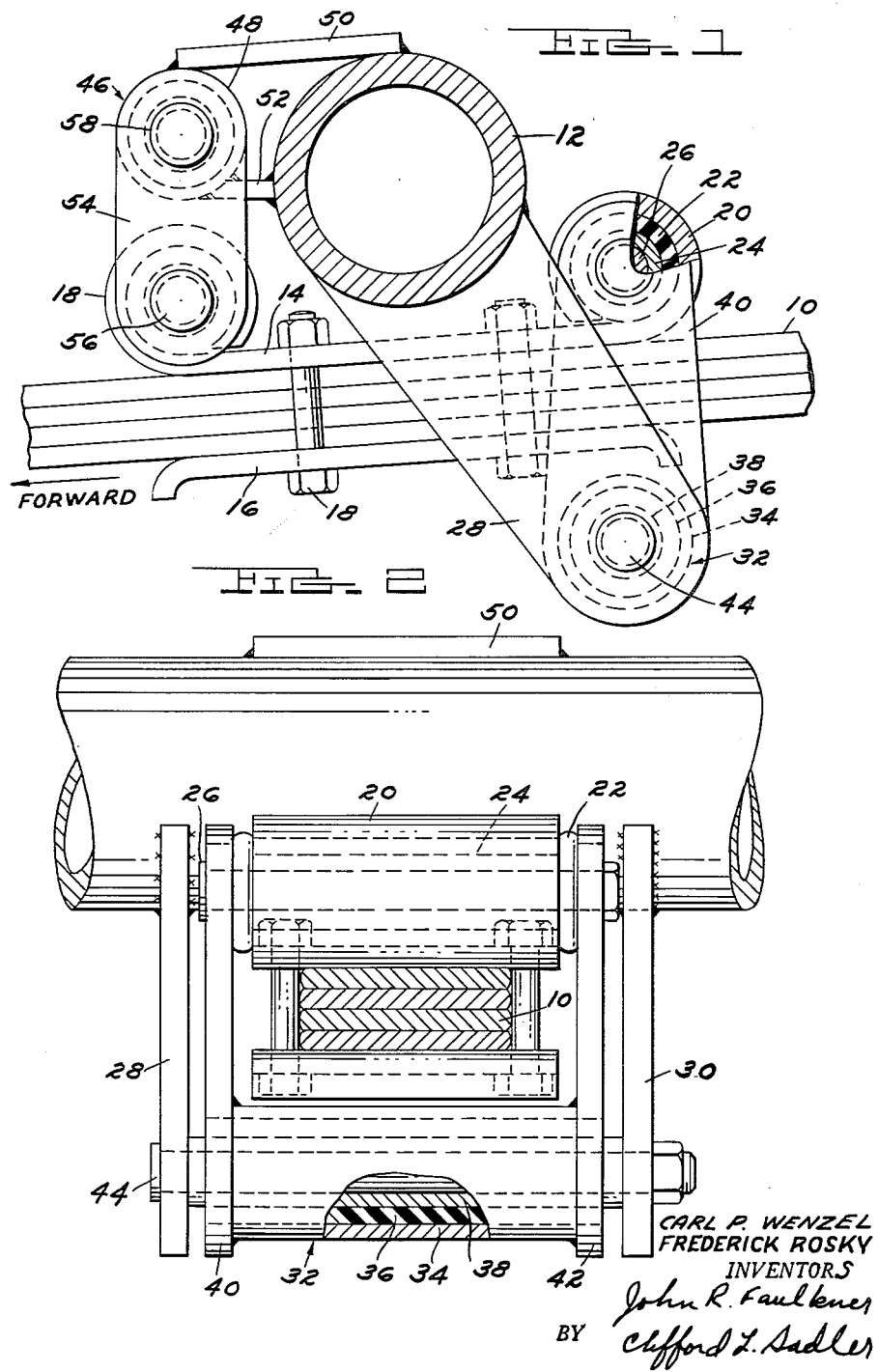

3,111,308
VEHICLE SUSPENSION
Carl P. Wenzel, Taylor, and Frederick Rosky, Dearborn, Mich., assignors to Ford Motor Company, Dearborn, Mich., a corporation of Delaware
Filed June 30, 1960, Ser. No. 39,976
10 Claims. (Cl. 267—52)

The present invention relates a suspension systems and more particularly to means for connecting longitudinally extending leaf type suspension springs to transversely arranged axle housings.

It is conventional practice in motor vehicles to have a pair of parallel longitudinally extending leaf springs that are associated with a rigid axle housing and to have a rigid supporting connection between the approximate midpoint of the springs and the housing. Unfortunately, with this arrangement road shocks are transferred directly from the wheels through the axle housing to the leaf springs. As the springs are connected to the passenger carrying vehicle body, such transmission of vibrations is objectionable.

The present invention provides an improvement in means for connecting leaf springs to axle housings so that minor road shocks will cause the axle to move slightly fore and aft relative to the springs. In other words, the road wheels will be able to "give" as they strike obstacles in the road. This ability of the wheels to move fore and aft is sometimes described as wheel compliance. Such action reduces the tendency for shocks to be transmitted through the axle to the springs which support the passenger carrying body.

Other objects and advantages of the present invention will become amply clear from the following description and accompanying drawings, in which:

FIGURE 1 is a side elevational view partly in section of a device for attaching an axle housing to leaf springs, and;

FIGURE 2 is a rear elevational view of the device shown in FIGURE 1.

Referring now to the drawings for a more complete understanding of this invention, FIGURE 1 discloses a plurality of longitudinal leaf springs 10 which are joined to an axle housing or tube 12. The tube 12 rotatably carries a wheel supporting axle (not shown). It constitutes a wheel support member. The leaf springs 10 are stacked one on top of another and are held between an upper plate 14 and a lower plate 16 by a set of four bolts 18. The leaf spring assembly 10 guides the axle housing 12 and the wheel rotatable mounted thereto for jounce and rebound movement. Thus, in addition to functioning as a resilient support the spring 10 constitutes a suspension positioning member.

The ends of the upper plate 14 are curled over to form front and rear eyes 18 and 20. The eyes 18, 20 receive cylindrically shaped rubber bushings 22. A tubular member 24 is positioned coaxially within the bushing 22. A pivot member in the form of a bolt 26 is rotatably received within the tube 24 of eye 20. The construction of the bushing at eye 18 is not shown in FIGURE 1 as it is identical to the bushing at eye 20.

A pair of spaced apart bracket members 28, 30 are secured to the tube 12 by weldments and extend downwardly and slightly rearwardly therefrom. A bushing assembly 32 is disposed beneath the spring 10 and parallel to the axis of the bolt 26. Bushing assembly 32 is conventional and includes a tubular outer member 34, coaxial rubber piece 36, and an inner tubular member 38 situated within the rubber 36.

A pair of compression shackles 40, 42 are pivoted at their upper ends by the bolt 26 and extend downwardly therefrom. The lower ends of the shackles 40, 42 are welded to the outer ends of the tube 34. A bolt 44 extends through the lower ends of the brackets 28, 30 and through the center of the inner tube 38 which forms a part of the bushing assembly 32.

An upper bushing assembly 46 of construction similar to the bushings at 18, 20 and 32 is provided with an outer tube 48. Tube 48 is rigidly connected to the axle housing 12 by upper and lower support members 50, 52 and weldments. A pair of tension shackles 54 are interposed between the bushing within the eye 18 and the bushing assembly 46. The lower ends of the shackles 54 are secured by a bolt 56 and a bolt 58 secures their upper ends. The bolts 56 and 58 pass through the center of their respective bushings at 18 and 46. This structure permits the shackles 54 to pivot about the axis of the bolts 56, 58. Both the tension shackles 54 and compression shackles 40, 42 are situated nearly vertical.

The foregoing structure allows limited longitudinal movement between the axle tube 12 and the spring 10. When a wheel carried by the axle journalled within the tube 12 strikes a small obstacle forces tending to move the axle and tube 12 upwardly and to the right will be created. Such forces will cause the tube 12 to move to the right relative to the spring 10 by rotating the shackles 40, 42 in a counterclockwise direction about bushings 32 and 20. At the same time shackles 54 will also rotate in a clockwise direction about the bushings 46 and 18. The deflection of the spring 10 will absorb the upward movement of the axle housing.

The rotation of the shackles results in longitudinal movement of the axle housing 12 relative to the springs 10. Thus with this structure the wheel is permitted slight fore and aft movement rather than causing all of the forces to be transmitted to the springs that carry the passenger compartment.

With the compression shackles 40, 42 located to the rear of the axle and vertical and the tension shackles 54 located in front of the axle and also vertical, axle windup is restricted. The shackle locations and lengths are important to allow the tension shackles 54 to carry the greatest load. This in turn allows the tension shackles 54 to control the returnability of the axle. Varying the shackle lengths and locations from the center of the axle controls the returnability of the tension shackle and also the wheel recession rate. These are important factors in reducing ride harshness.

The foregoing description constitutes the preferred embodiment of the present invention; however, modifications may occur to those skilled in the art which will come within the scope and spirit of the appended claims.

We claim:

1. A device connecting an axle housing to a leaf spring comprising spaced apart tension and compression shackles, said compressison shackles being pivotally connected at one of their ends to an axle housing bracket below said spring, said tension shackles being pivotally connected at one of their ends to a second axle housing bracket above said spring and said shackles being connected to said spring at the other of their ends.

2. A device attaching a transverse axle housing to a longitudinally extending leaf spring comprising spaced apart vertical tension and vertical compression shackles, said compression shackles being pivotally connected at one of their ends to an axle housing bracket below said spring and rearwardly of said housing, said tension shackles being pivotally connected at one of their ends to a second axle housing bracket above said springs and forwardly of said housing, and said shackles being connected to said spring at the other of their ends.

3. A device attaching a transverse axle housing to a longitudinally extending leaf spring comprising spaced apart tension and compression shackles, said compression shackles being pivotally connected to an axle housing bracket below said spring and to a spring bracket above said spring, and said tension shackles being pivotally connected to a second axle housing bracket above said spring and to said spring bracket.

4. A device attaching a transverse axle housing to a longitudinally extending leaf spring comprising spaced apart vertical tension and vertical compression shackles, said compression shackles being pivotally connected to an axle housing bracket below said spring and to a spring bracket above said spring, said tension shackles being pivotally connected to a second axle housing bracket above said spring and to said spring bracket, and said compression shackle being disposed rearwardly of said housing and said tension shackle disposed forwardly of said housing.

5. A vehicle suspension system having a wheel support member and a positioning member therefor having a portion adapted to traverse a jounce and rebound path, suspension means interconnecting said support member and said portion, said means including a first shackle and a second shackle, said shackles each having one end connected to said support member and their other end connected to said portion, said shackles being loaded in tension and compression respectively when said system is under static conditions.

6. A suspension system for a vehicle having a wheel support member and a positioning member therefor having a portion adapted to traverse a jounce and rebound path, suspension means interconnecting said support member and said portion, said means including a first shackle and a second shackle, said shackles being loaded in tension and compression respectively when said system is under static conditions, said shackles having pivotal connections with said support member, said pivotal connections having generally transverse pivot axes relative to said vehicle.

7. A vehicle suspension system having a wheel support member and a positioning member therefor having a portion adapted to traverse a jounce and rebound path, suspension means interconnecting said support member and said portion, said means comprising first and second shackles pivotally connected at their upper ends to said support member and to said portion at their lower ends, one of said shackles being loaded in compression when said system is in a static condition.

8. A vehicle suspension system having a wheel support member and a positioning member therefor having a portion adapted to traverse a jounce and rebound path, suspension means interconnecting said support member and said portion, said means comprising first and second shackles pivotally connected at their upper ends to said support member and to said portion at their lower ends, one of said shackles being loaded in tension and the other of said shackles being loaded in compression when said system is under static conditions.

9. A vehicle suspension system haivng a wheel support member and a leaf spring, suspension means interconnecting said spring and said member, said means including a first vertical shackle and a second vertical shackle, said shackles each having one end connected to said spring and their other end connected to said member, said shackles being loaded in tension and compression respectively when said system is under static conditions.

10. A suspension system having a wheel support member and a leaf spring member, suspension means interconnecting said members, said means comprising first and second shackles pivotally connected at their upper ends to said support member and to said spring member at their lower ends, one of said shackles being loaded in compression when said system is under static condition.

References Cited in the file of this patent

UNITED STATES PATENTS

| | | |
|---|---|---|
| 2,309,812 | Utz | Feb. 2, 1943 |
| 2,621,920 | Hogston et al. | Dec. 16, 1952 |
| 2,762,445 | Polhemus | Sept. 11, 1956 |

FOREIGN PATENTS

| | | |
|---|---|---|
| 534,022 | France | Dec. 26, 1921 |
| 622,428 | Germany | Nov. 7, 1935 |
| 9,320 | Great Britain | May 9, 1893 |